United States Patent [19]

Nowak et al.

[11] Patent Number: 5,091,052
[45] Date of Patent: Feb. 25, 1992

[54] METHOD FOR PRODUCING INDIVIDUALIZED LABELS

[75] Inventors: Michael T. Nowak, Gardner, Mass.; Thomas E. Lewis, E. Hampstead, N.H.

[73] Assignee: Presstek, Inc., Hudson, N.H.

[21] Appl. No.: 607,512

[22] Filed: Oct. 1, 1990

[51] Int. Cl.⁵ .................. B44C 1/22; C23F 1/02; B29C 37/00

[52] U.S. Cl. .................. 156/643; 156/656; 156/665; 156/345; 156/272.2; 156/272.6; 219/69.17

[58] Field of Search .......... 156/643, 646, 656, 658, 156/665, 345, 272.2, 272.4, 272.6; 204/192.32, 192.35, 192.36; 219/121.4, 121.41, 69.11, 69.15, 69.17; 101/453, 467; 428/343; 252/79.1

[56] References Cited

U.S. PATENT DOCUMENTS 3,483,027 12/1969 Ritzerfield et al. ............ 156/658 X
3,516,911 6/1970 Hopps, Jr. ............................ 204/2
4,552,829 11/1985 Masaki ............................ 156/658 X
4,718,340 1/1988 Love, III ............................ 101/116
4,729,310 3/1988 Love, III ............................ 101/157
4,735,678 4/1988 Mandigo ............................ 156/654 X

FOREIGN PATENT DOCUMENTS 0130028 12/1985 European Pat. Off. .
0167352 1/1986 European Pat. Off. .
64-30786 2/1989 Japan .

Primary Examiner—William A. Powell
Attorney, Agent, or Firm—Cesari and McKenna

[57] ABSTRACT

A novel method of producing individualized labels using a non-contacting spark-discharge or plasma-discharge recording apparatus. The apparatus is used to image recording constructions that comprise a conductive background layer, an underlying image layer contrasting in tonality and/or color to the background layer, and an adhesive layer.

11 Claims, 2 Drawing Sheets

METHOD FOR PRODUCING INDIVIDUALIZED LABELS

I. BACKGROUND OF THE INVENTION

A. Field of the Invention

The present invention relates to efficient production of individualized labels, and more particularly to a method of producing such labels using spark-discharge recording techniques and constructions therefor.

B. Description of the Related Art

Current mass-production labelmaking methods are typically directed toward generating large numbers of identical labels at low unit cost. Examples of traditional methods include block or plate printing processes that utilize solvent- or water-based printing inks. Such methods are inherently inapplicable to applications requiring some degree of uniqueness to be imparted to each label, however, because reconfiguration of the printing apparatus is mechanically prohibitive.

Individualized labels, or labels containing a field within which one or more printed elements are varied, are gaining in importance with the emergence of low-cost optical and magnetic scanning devices. While manufacturers have long identified goods with unique serial numbers or other such markings, scanning equipment permits rapid and automatic retrieval of a variety of information associated with a particular item, such as date of manufacture, origin and current price. Such information, or portions thereof, may apply only to a single item or group of items, and can also be subject to change. Its ready availability greatly simplifies inventory control, transportation and cashier operations.

Readily accessible sources of information about particular individuals have also become necessary, as transactions that have heretofore required written instruments now are amenable to electronic execution. Credit, banking and identification information may be encoded on magnetic media that an individual can conveniently carry and present to a scanning device, permitting convenient financial dealings and credit approval.

We are aware of few techniques expressly developed for large-scale production of individualized labels, although some known technologies might be adaptable to this purpose. For example, U.S. Pat. No. 4,638,340 discloses a two-color thermosensitive recording label capable of forming two different colors when heated at different temperatures. U.S. Pat. No. 4,577,205 discloses labels comprising an ink layer curable by electron-beam emission and a thermosensitive color-forming layer. Both types of labels appear capable of production using high-speed, computer-controlled imaging equipment However, both involve chemical reactions for imaging, and typical thermosensitive recording apparatus require contact between a recording stylus and the thermosensitive material.

The present invention utilizes non-contacting spark-discharge recording apparatus, such as that described in U.S. Pat. No. 4,911,075 (commonly owned with the present application and hereby incorporated by reference); copending application Ser. Nos. 07/413,172, filed Sept. 27, 1989, U.S. Pat. No. 5,005,479 and 07/554,089, filed Jul. 17, 1990 (commonly owned with the present application and hereby incorporated by reference); and a PCT application filed in the U.S. Patent and Trademark Office on Sept. 28, 1990 entitled "Plasma-Jet Imaging Apparatus and Method" and assigned Ser. No. US90/05546 (also commonly owned with the present application and hereby incorporated by reference). This type of imaging system offers speed, precision and amenability to computer control. It has been applied to lithographic and mask printing, where a single plate is used repeatably to print multiple copies of the same image, but not, as far as we are aware, to direct production of finished articles.

II. DESCRIPTION OF THE INVENTION

A. Objects of the Invention

Accordingly, it is an object of the present invention to provide a method of using spark-discharge recording techniques to produce individualized labels.

It is a further object of the invention to create labels using a dry process that does not involve chemical transformations.

It is another object of the invention to facilitate manufacture of unique labels using non-contact spark-discharge apparatus.

It is yet another object of the invention to produce labels having fine features and line definition.

Other objects will, in part, be obvious and will, in part, appear hereinafter. The invention accordingly comprises the several steps and the relation of one or more of such steps with respect to the others all as exemplified in the following summary and detailed description, and the scope of the invention will be indicated in the claims.

B. Summary of the Invention

The method of the present invention comprises use of a non-contacting spark-discharge recording apparatus (such as those described in the '075 patent, the '172 and '089 applications, and the '546 PCT application) to destroy, at selected points, the top layer of a composite substrate (which, despite its uppermost position, serves as the undecorated area and is therefore referred to as the "background layer") to reveal a second "image layer" thereunder. The backgound layer is a conductive, preferably metal layer which is removed by the high-voltage spark at the points of contact. This process of selective removal is hereinafter referred to as "imaging".

In our method, a digital representation of the desired label image pattern is stored as a datafile accessible by a suitably programmed computer. The computer directs the operation of control circuitry that manipulates the position of the spark-discharge electrode with respect to the construction to be imaged, and causes firing of the electrode when appropriate.

Use of non-contact equipment offers a number of key advantages. As described in the above-mentioned references, it is possible to tune the discharges of non-contact imaging equipment to produce image spots of desired sizes, allowing the user to select among a broad range of resolutions; this contrasts with traditional contact-type systems, in which the size of the electrode stylus can limit feature resolution. In addition, the lack of contact between the discharge source and the surface of the recording material permits the omission of certain features—such as lubricating layers, special textures and extreme hardness—that characterize recording materials used in conjunction with contact-type equipment, thereby allowing us to use a wide range of suitable constructions.

Choice of the material forming the image layer depends on the function of the label. For purely decorative applications, the image layer might be a colored film, and the background layer a dark composition such as black iron oxide ($Fe_3O_4$) dispersed with carbon, a pigment, a dye and/or a metal powder (hereinafter referred to as a "black iron oxide dispersion"), or a similar dispersion of carbon black (hereinafter referred to as a "carbon black dispersion").

Particular characteristics of spark-discharge or plasma-jet discharge apparatus suitable for use with the present invention are described in the '075 patent, the '172 and '089 applications, and the '546 PCT application. Performance characteristics and operating ranges disclosed in the '546 PCT application are, for purposes of the present invention, equally applicable to the spark-discharge apparatus disclosed in the '075 patent and the '172 and '089 applications. In particular, preferred applied voltage levels for spark or plasma-jet imaging range from 1,000 to 5,000 volts, with potential levels above 2,000 volts being especially preferred; and preferred working current levels range from 0.1 to 1 amp.

The image layer can also carry information. It can, for example, be a magnetic film, points or strips of which are selectively exposed by elimination of the overlying background layer. Alternatively, it can be a material that absorbs radiation reflected by the metal layer (or vice versa), facilitating discernment of demetallized portions by appropriate radiation-detection equipment. A magnetic, reflective or absorptive layer can instead be affixed beneath the image layer to provide identification of the label material (e.g., to prevent unauthorized use of the imaging apparatus).

An adhesive layer is applied beneath the image layer. This layer can consist of any substance or material capable of bonding the label to a substrate of interest. If the adhesive is of the pressure-sensitive variety, release paper is affixed thereunder.

The method of the present invention is suitable for use with individual labels, as well as with conventional "web press" equipment that draws an elongated strip of label material across the path of the imagemaking device.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE INVENTION

Figure 1A:
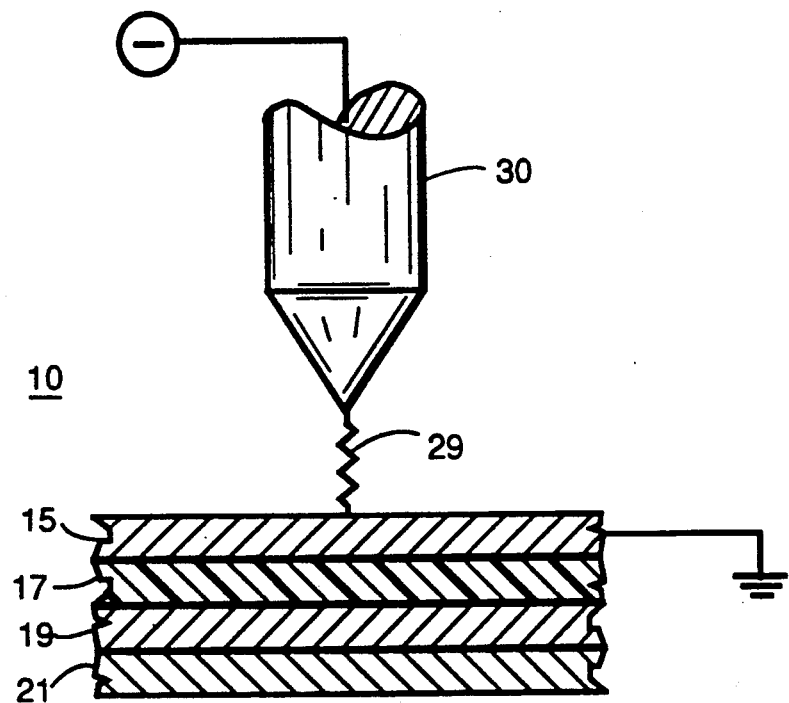
FIG. 1A is a cross-sectional view of a composite structure suitable for use with the present invention.

In FIG. 1A, reference numeral 10 denotes generally a cross-sectional view of a composite structure suitable for use with the method of the present invention. Background layer 15 is a conductive, preferably metal material that is susceptible to removal by the action of a high-voltage spark 29 produced by imaging head 30. Using the spark-discharge recording apparatus described in the '075 patent or the '172 application, or the plasma-jet imaging apparatus described in the '546 PCT application or the '089 application, we have obtained image details as small as 0.0001 inch. As discussed in greater detail below, we have obtained advantageous results using a background layer of zinc, aluminum or copper metal and derivatives thereof, as well as indium tin oxide compounds. The particular metal chosen will depend on the function of the label and the nature of the image layer. Generally, this layer should be thin, on the order of 300 to 750 angstroms, and can be applied using vapor deposition techniques, vacuum metallization or sputtering methods. All of the foregoing techniques are well-characterized in the art.

Image layer 17 can take a number of forms. For decorative labels, image layer 17 will be some form of colored film or paper that contrasts visually with background layer 15. In one embodiment, the film is a polymeric composition colored by dyes or pigments suitable for introduction within a polymer matrix; such materials are well-characterized in the art. The polymeric composition may be polyester, nylon, polycarbonate, polystyrene, polyolefin or acrylic, and should have a thickness in the range of 0.0005 to 0.01 inch.

Dyes are soluble in many materials, including polymeric compositions, and may therefore be added to the film melt and solubilized therein (e.g., by mechanical shear) prior to extrusion of the film. Because pigments are insoluble in most common solvents, it is typically necessary to create a stable dispersion of pigment particles that may be added to the film melt prior to extrusion. For example, it is common to pulverize pigment particles in order to reduce their average size (such as by crushing them against zirconia beads) in the presence of a dispersing surfactant; the latter maintains the stability of the resulting dispersion by retarding reagglomeration. If the pigment dispersion is to be added to a plastic film, the dispersant is usually another plastic resin that is compatible with the film material; the dispersion can be added in the form of chips to the film melt, mixed until an acceptable level of homogeneity is reached, and the pigmented film extruded.

If image layer 17 is to be colored, background layer 15 can be chosen to provide optimum contrast. For a dark background, a black iron oxide dispersion or a carbon black dispersion—the relative proportions of which will be determined by the desired tonality—can be employed for background layer 15.

Alternatively, zinc or zinc oxide provides a suitable background layer that is nearly white. An intermediate tonality is achieved using aluminum metal, which appears silvery gray. It is also possible to incorporate pigment particles within the material of image layer 17, in order to add color thereto. Suitable pigments include the conductive tin oxide pigments marketed by Keeling & Walker, Ltd., London, England under the name Stanostat, preferably in combination with one or more colored pigments.

Figure 1B:
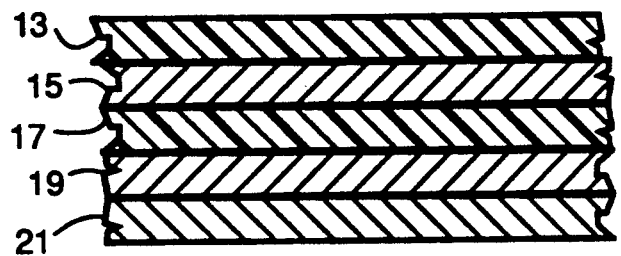
FIG. 1B depicts a cross-sectional view of a useful composite structure that includes an organic coating layer.

As illustrated in FIG. 1B, it is sometimes desirable to add an organic coating 13 above background layer 15 to protect the background layer from scratching, and/or to add color thereto. In order to preserve imaging accuracy, this layer must permit spark 29 to evaporate it or pass therethrough without altering the spark's path. Suitable silicone coatings are described in our U.S. Pat. No. 4,911,075. To these coatings can be added various colored pigments or dyes, as hereinabove described; such pigments or dyes provide the most visually apparent results when applied over white metal background layers such a zinc oxide.

Alternatively, organic coating 13 can be a polyester, acrylic, polyamide or nitrocellulose resin. Suitable polyester resins are well-characterized in the art; to these may be added additional reactive functional groups (such as hydroxyl, carboxyl, amine, etc.) to react with another component of the coating (e.g., reactive groups of a cross-linking resin such as Cymel 303 [marketed by American Cyanamid Company, Wayne, N.J.]). Other suitable polyester films include non-reactive lacquers that contain a medium-weight, film-forming polyester (e.g., Vitel 200 [marketed by The Goodyear Tire & Rubber Company, Akron, Ohio]).

Useful acrylic coatings include acrylic resins that contain reactive functional groups capable of bonding to cross-linking resins (such as Cymel 303), as well as fully reacted, medium-weight solution acrylic resins (such as Acryloid B-66 [marketed by Rohm and Haas Company, Philadelphia, Pa.]).

Suitable polyamide coatings include medium-weight polyamide resins (or mixtures thereof) that dry as a lacquer (by solvent or water evaporation) to form a film.

Advantageous nitrocellulose coatings comprise nitrocellulose as the main film-forming polymer. To this may be added other polymers (such as polyamides, acrylics or polyesters), reactive resins (such as Cymel 303) and appropriate catalysts (such as p-toluene sulfonic acid) to enhance performance.

To any of these coatings may be added ultraviolet and electron-beam curable coating compositions, plastisols, organosols and powder-type coatings.

To the extent that it is desirable to utilize one or more of these coatings, they can be applied before or after imaging. If applied before imaging, our "selective filler" pigments (described in copending application Ser. No. 07/442,317, filed Nov. 28, 1989, commonly owned with the present application and hereby incorporated by reference) can be added to enhance accuracy of the spark discharge.

The label may also be constructed to carry information. In one type of construction, coating layer 13 acts as an information-bearing substrate that is encodes data according to a machine-readable pattern. The image layer then provides an insulating function. In a preferred embodiment, coating layer 13 includes a dispersion of magnetic particles. Spark discharge destroys an adjacent point both on coating layer 13 and background layer 17; image layer 17 exhibits no magnetic activity. The pattern of magnetic material remaining on the construction after imaging can be sensed by a suitable detector assembly, well-known in the art, and thereby serve as a source of permanently encoded data. Various magnetic pigments, such as cobalt-modified iron oxide particles (e.g., PFERRICO 2674, marketed by Pfizer, Inc., New York, N.Y.) and gamma iron oxide (e.g., PFERROX 2228HC, also marketed by Pfizer), may be dispersed within the matrix of the coating layer materials described hereinabove.

A second information-bearing construction includes an image layer containing a material that absorbs radiation reflected by the metal layer, facilitating discernment of demetallized portions by appropriate radiation-detection equipment. Thus, if background layer 15 includes a metal or reflective metal derivative, it will reflect infrared radiation. Use of an infrared-absorbing material for image layer 15 permits formation of a data matrix according to the pattern of demetallization. Such a layer can be formed by dissolving, within a hot melt of the material that will serve as image layer 17, an infrared-absorbing compound that is soluble in non-polar environments. Examples of such compounds include ICI S101756 (which absorbs in the range 725–840 nm, and is marketed by ICI Colours & Fine Chemicals, Manchester, England) and ICI S109186 (which absorbs in the broad range 600–1,100 nm); both are suitable for introduction within the image layer materials discussed earlier.

Figure 2:
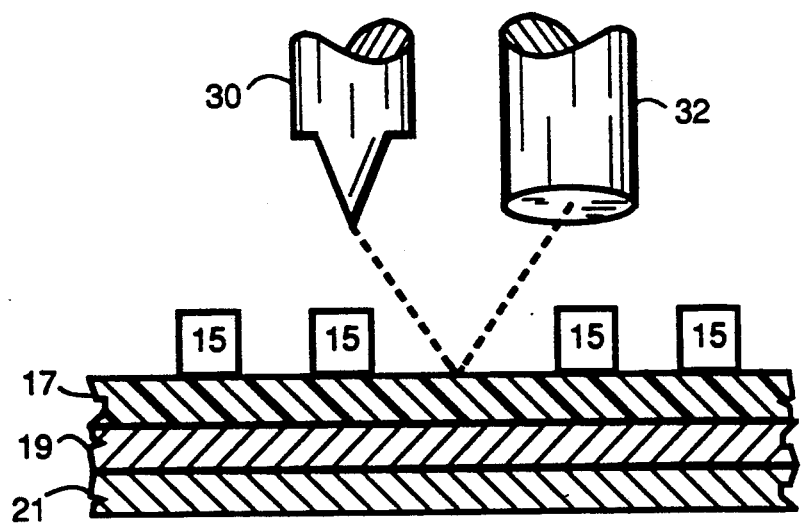
FIG. 2 illustrates use of the present invention to prepare information-bearing labels readable by electronic means.

As shown in FIG. 2, this pattern (denoted collectively by reference numeral 15) can be read with a suitable source of infrared light 30 and appropriately positioned detector 32.

Along similar lines, background layer 15 can comprise a metal or reflective metal derivative that reflects ultraviolet radiation. The material of image layer 15 is then chosen to absorb such radiation. Suitable ultraviolet-absorbing compounds include TINUVIN 1130 (which exhibits an absorption maximum at 343 nm, and is marketed by Ciba-Geigy Corp., Ardsley, N.Y.) and GIVSORB UV-2 (which absorbs in the broad range 290–400 nm, and is marketed by Givaudan Corp., Clifton, N.J.). Both of these materials may be incorporated within our image layer materials in the hot-melt stage.

Adhesive layer 19 can be any bonding compound capable of affixing the label to its intended location. Layer 19 is preferably a pressure-sensitive adhesive such as AROSET (marketed by Ashland Chemical Company, Columbus, Ohio), but can also be a heat-sealable adhesive such as MACROMELT (marketed by Henkel Corp., LaGrange, Ill.), a moisture-activated adhesive, a magnetic plate, or Velcro (marketed by Velcro International, Manchester, N.H.), to name a few alternatives.

Release-paper layer 21 is necessary only if adhesive layer 19 is pressure-sensitive.

Figure 1C:
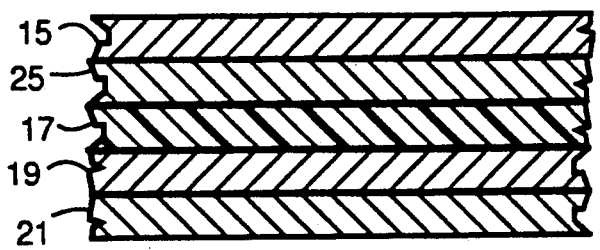
FIG. 1C shows a cross-sectional view of a composite structure that conveys visual as well as magnetically encoded information.

FIG. 1C illustrates a variation of the magnetic embodiment discussed previously. This construction permits placement of visual information directly above magnetically encoded information, thereby both saving label space and obscuring the existence of the magnetic layer.

In this construction, background layer 15 overlies layer 25, which is a magnetic layer or strip that permanently encodes information entered by a suitable recording device, and which preferably contrasts in color or tonality with layer 23. The spark-discharge recording apparatus selectively removes portions of layer 23, thereby revealing corresponding areas of layer 25. The pattern of removal dictates the form of the visual image. However, because layer 25 is unaffected, the magnetic information contained therein remains undisturbed. Furthermore, the presence or absence thereover of layer 23, which is conductive, does not affect the readability of the magnetic information by an external scanner.

Naturally, layer 25 must be impervious to the effects of the spark-discharge apparatus. The material of layer 25 should therefore either be fabricated from magnetic particles dispersed with the image-layer material discussed hereinabove, or be covered with a protective coating of image-layer material.

It is also possible to incorporate an identification layer within any of the foregoing structures. This layer can be detected by a reading probe preferably located proximate to the recording electrode. If this layer is not detected, the spark-discharge apparatus can be configured to enter a disabled mode and/or notify the operator that an inappropriate substrate has been chosen. This facilitates prevention of unauthorized operation, as well as misuse of the spark-discharge apparatus.

Figure 1D:
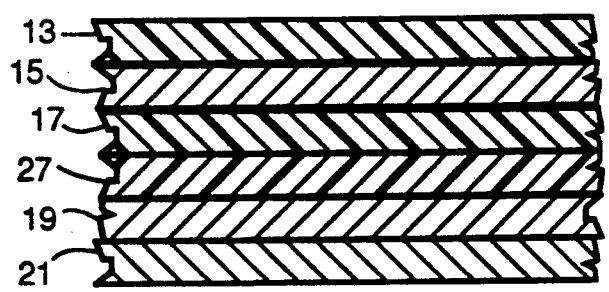
FIG. 1D is a cross-sectional view of a composite structure containing an identification layer.

A construction containing such an identification layer, denoted by reference numeral 27, is shown in FIG. 1D (which features the optional coating layer 13). In this arrangement, image layer 17 is a film that is transparent to certain forms of radiation (such as infrared or ultraviolet) that are reflected by background layer 15. Layer 27 absorbs such radiation, e.g., in the manner described hereinabove with respect to the information-bearing embodiments. Using the apparatus shown in FIG. 2, with the source and detection component assembly positioned rearward of the spark-discharge electrode of the recording device with respect to its direction of relative motion, the detector component will receive source radiation reflected from layer 27 at points where layers 13 and 15 have been burned away. If radiation is detected when the assembly reaches the first point imaged by the recording electrode, it is certain that layer 27 is not present, and operation of the spark-discharge apparatus is interrupted.

Alternatively, identification layer 27 can be chosen to reflect a characteristic wavelength or set of wavelengths ordinarily absorbed by background layer 15, and the source/detector assembly configured to respond to the reflected radiation. The choice of reflection or absorption as a triggering signal, as well as selection of the specific wavelengths, will naturally depend on the characteristics of the materials whose substitution for the present construction is objectionable.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of producing a label, the method comprising the steps of:
   a. providing a construction comprising:
      i. a conductive background layer;
      ii. an underlying image layer contrasting from the background layer in at least one characteristic selected from the group consisting of tonality and color, the image layer being substantially impervious to erosion by the recording apparatus; and
      iii. an adhesive layer;
   b. causing relative movement between the construction and a non-contacting spark-discharge or plasma-discharge recording apparatus located proximately thereto; and
   c. removing the conductive layer at selected points by spark or plasma discharge.

2. The method of claim 1 wherein the construction further comprises an organic coating layer.

3. The method of claim 1 wherein the non-contacting spark-discharge recording apparatus comprises at least one electrode.

4. The method of claim 1 wherein the plasma-discharge recording apparatus comprises at least one plasma-jet discharge source, each of which includes a writing head comprising a nozzle and an electrode disposed behind the nozzle.

5. The method of claim 4 further comprising the step of flowing a working gas under pressure through each nozzle.

6. The method of claim 5 wherein the working gas is chosen from the group consisting of argon, neon, xenon, krypton, helium, air, moist air and mixtures thereof.

7. The method of claim 1 wherein each spark discharge is produced by delivering high-voltage pulses in excess of 2,000 volts to each electrode to produce arc discharges substantially perpendicular to the construction.

8. The method of claim 1 wherein each plasma discharge is produced by delivering high-voltage pulses in excess of 2,000 volts to each electrode to produce ionized plasma-jet discharges substantially perpendicular to the construction.

9. The method of claim 1 wherein the discharges carry current of at least 0.1 amp.

10. The method of claim 1 further comprising the step of varying a characteristic selected from the group consisting of voltage, current and time duration of the discharges for varying the amount of the conductive layer removed by each discharge.

11. The method of claim 1 further comprising the step of controlling the discharges in accordance with a digital representation of a label image so that they occur at the selected points to form the label image on the construction.

* * * * *